(12) United States Patent
Yun et al.

(10) Patent No.: US 7,089,805 B2
(45) Date of Patent: Aug. 15, 2006

(54) AVERAGE BIDIRECTIONAL FLOW TUBE

(75) Inventors: Byong-Jo Yun, Daejeon (KR); Kyoung-Ho Kang, Daejeon (KR); Dong-Jin Euh, Daejeon (KR); Won-Pil Baek, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 47 days.

(21) Appl. No.: 11/048,137

(22) Filed: Feb. 1, 2005

(65) Prior Publication Data

US 2005/0229717 A1  Oct. 20, 2005

(30) Foreign Application Priority Data

Apr. 6, 2004 (KR) .................. 10-2004-0023545
Jan. 25, 2005 (KR) .................. 10-2005-0006705

(51) Int. Cl.
*G01F 1/46* (2006.01)
*G01F 1/32* (2006.01)

(52) U.S. Cl. ................. 73/861.65; 73/861.52
(58) Field of Classification Search ............ 73/861.52, 73/861.65, 861.66
See application file for complete search history.

(56) References Cited

U.S. PATENT DOCUMENTS 2,927,462 A * 3/1960 Li .......................... 73/861.58
4,083,244 A * 4/1978 Agar et al. ............... 73/204.21
4,290,315 A * 9/1981 Grorberg .................. 73/861.61
5,031,466 A * 7/1991 Redus ...................... 73/861.04

FOREIGN PATENT DOCUMENTS

EP         0 315 175      5/1989
WO     WO 03/089883    10/2003

* cited by examiner

*Primary Examiner*—Harshad Patel
(74) *Attorney, Agent, or Firm*—Bachman & LaPointe, P.C.

(57) ABSTRACT

An average bidirectional flow tube, including a body having two side plates and upper and lower plates, a partition plate installed to be perpendicular to the side plates of the body so that front and rear ends of the tube are separated from each other, and two pairs of pressure impulse lines installed at front and rear positions of the partition plate. The upper and lower plates of the body each have a curvature to be in contact with an inner surface of a pipe in which the average bidirectional flow tube is installed, and each of the pressure impulse lines is installed to communicate with an interior of the pipe. Although a two-phase flow occurs in the pipe or the flow of the fluid flowing in the pipe is changed, an average flow rate of a fluid can be measured. Particularly, it is easy to measure an average flow rate of the fluid when the fluid flows at a low speed. Further, even when sudden pressure reduction occurs in the pipe, an additional cooling device is not required. When a two-phase flow occurs in the pipe, the fluid suffers a phase change due to the sudden pressure reduction of the pipe, or a stratified flow occurs due to the two-phase flow in a horizontal pipe, it is unnecessary to displace the average bidirectional flow tube.

3 Claims, 9 Drawing Sheets

PRIOR ART

PRIOR ART

PRIOR ART

AVERAGE BIDIRECTIONAL FLOW TUBE

BACKGROUND OF THE INVENTION

1. Field of the Invention

The present invention relates generally to flow meters used to measure a flow rate of a fluid in a fluid system, and more particularly, to a flow meter capable of measuring a mass flow rate of a fluid, even if a single-phase or two-phase flow occurs in a vertical pipe or a stratified flow occurs in a horizontal pipe.

2. Description of the Related Art

FIG. 1 is a side sectional view of a pipe 1 equipped with a conventional pitot tube 10, with the pitot tube 10 comprising a double pipe (not shown). As shown in FIG. 1, the conventional pitot tube 10 is configured such that a total pressure hole 11 and a static pressure hole 13 are formed at predetermined positions in the double pipe. The pitot tube 10 is installed such that the total pressure hole 11 is opposite to the direction of fluid-stream movement. A total pressure acting on the total pressure hole 11 is a sum obtained by adding a static pressure to a dynamic pressure due to a fluid flowing in the pipe. Only the static pressure acts on the static pressure hole 13. Further, a pressure impulse line 15 extends from the double pipe having the total pressure hole 11 and the static pressure hole 13. As shown in FIG. 1, a differential pressure transmitter (not shown) connected to the pressure impulse line 15 measures the difference (ΔP) between a pressure acting on the total pressure hole 11 and a pressure acting on the static pressure hole 13. By the measured result, a flow velocity of the fluid is calculated. The flow velocity measured by the pitot tube 10 is a flow velocity at a position where the pitot tube 10 is located, but not an average flow velocity of the fluid flowing along the pipe 1. Thus, in order to find the average flow velocity of the fluid in the pipe 1, the flow velocity of the fluid must be measured at many positions several times while changing the insertion depth of the pitot tube 10, and then the mean flow velocity must be calculated.

FIG. 2 is a side sectional view to show a conventional average pitot tube 20, and FIG. 3 is a front sectional view of the conventional average pitot tube 20. In this case, the average pitot tube 20 comprises a double pipe (not shown). In the following description, those elements common to the pitot tube, of FIG. 1 and the pitot tube of FIGS. 2 and 3 will carry the same reference numerals.

As shown in FIGS. 2 and 3, a plurality of total pressure holes 21 and a plurality of static pressure holes 23 are formed on the double pipe of the conventional average pitot tube 20. A pressure impulse line 25 extends from the double pipe to be connected to a differential pressure transmitter (not shown). The principle of measuring the flow velocity of a fluid flowing in the pipe 1 remains the same as that of the pitot tube 10 of FIG. 1.

As described above, the pitot tube 10 is problematic in that the flow velocity of the fluid flowing in the pipe 1 must be repeatedly measured at many positions several times, so that it is complicated to measure the flow velocity and a longer time is required to measure the flow velocity. In order to solve the problems, the average pitot tube 20 has been proposed. The average pitot tube 20 is constructed so that total pressures are measured at a plurality of total pressure holes 21, and static pressures are measured at a plurality of static pressure holes 23. Thereby, the total pressures and the static pressures are simultaneously measured at several positions in the pipe 1, thus allowing an average flow rate of the fluid to be conveniently calculated.

FIGS. 4 and 5 show a local bidirectional flow tube 30. As shown in FIGS. 4 and 5, the local bidirectional flow tube 30 includes a cylindrical body 31, a partition plate 33, and a pressure impulse line 35. In the following description, those elements common to the pitot tubes of FIGS. 1 and 2 and the flow tube of FIGS. 4 and 5 will carry the same reference numerals.

The principle of measuring a flow velocity using the local bidirectional flow tube 30 is similar to the measuring principle using the pitot tube 10 of FIG. 1 and the average pitot tube 20 of FIG. 2. As for a fluid flowing forward, when the local bidirectional flow tube 30 is installed as shown in FIG. 4, the total pressure obtained by adding the static pressure to the dynamic pressure due to the fluid flowing in the pipe acts on the A part. On the other hand, a back pressure acts on the B part. At this time, the back pressure is slightly less than the static pressure due to a suction effect caused by a flow velocity of the fluid of the B part. The pressures acting on the A part and the B part are transmitted to the differential pressure transmitter through the pressure impulse line 35, so that the pressure difference between the A part and the B part is measured. Thereby, the average flow velocity of the fluid is calculated under any flow condition.

In the case of using the above-mentioned average pitot tube 20, when a two-phase flow may occur in the pipe 1, for example, when a liquid flows along the bottom of the pipe 1 and gas flows separately above the liquid, a pressure difference is generated between the total pressure holes 21, so that the liquid may escape from the average pitot tube 20 to the flow path in the pipe 1. Further, when a sudden pressure reduction occurs in the pipe 1 and then the pressure acting on the pressure impulse line 25 is abruptly reduced, a phase change may occur in the pressure impulse line 25. Thus, in order to solve the problem, an additional cooling device is required. Further, the local bidirectional flow tube 30 is problematic as follows. That is, the local bidirectional flow tube 30 is not capable of being used to measure the average flow rate of the fluid in the pipe 1.

Further, when two-phase flow occurs in the pipe 1, or the fluid suffers a phase change due to a the sudden pressure reduction in the pipe 1, or stratified flow of a two-phase fluid occurs in a horizontal pipe, the local bidirectional flow tube 30 must be displaced to another position to measure the average flow rate.

SUMMARY OF THE INVENTION

Accordingly, the present invention has been made keeping in mind the above problems occurring in the prior art, and an object of the present invention is to provide a flow meter, which is capable of measuring an average flow rate of a fluid under various flow conditions in a pipe, for example, a single-phase flow and a two-phase flow, and easily measuring the flow rate of a fluid flowing at a low speed by the effect of reducing back pressure, and measuring a flow rate without an additional cooling device in spite of pressure reduction in the pipe. In order to accomplish the above object, the present invention provides an average bidirectional flow tube, including a partition plate provided in a rectangular body, and one or two pairs of pressure impulse lines provided at each of front and rear positions of the partition plate. According to the present invention, the average bidirectional flow tube is capable of measuring an average flow rate of a fluid in the pipe although various types of flow, such as two-phase flow, occur, and preventing a phase change in each pressure impulse line, such that a cooling device is not required.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
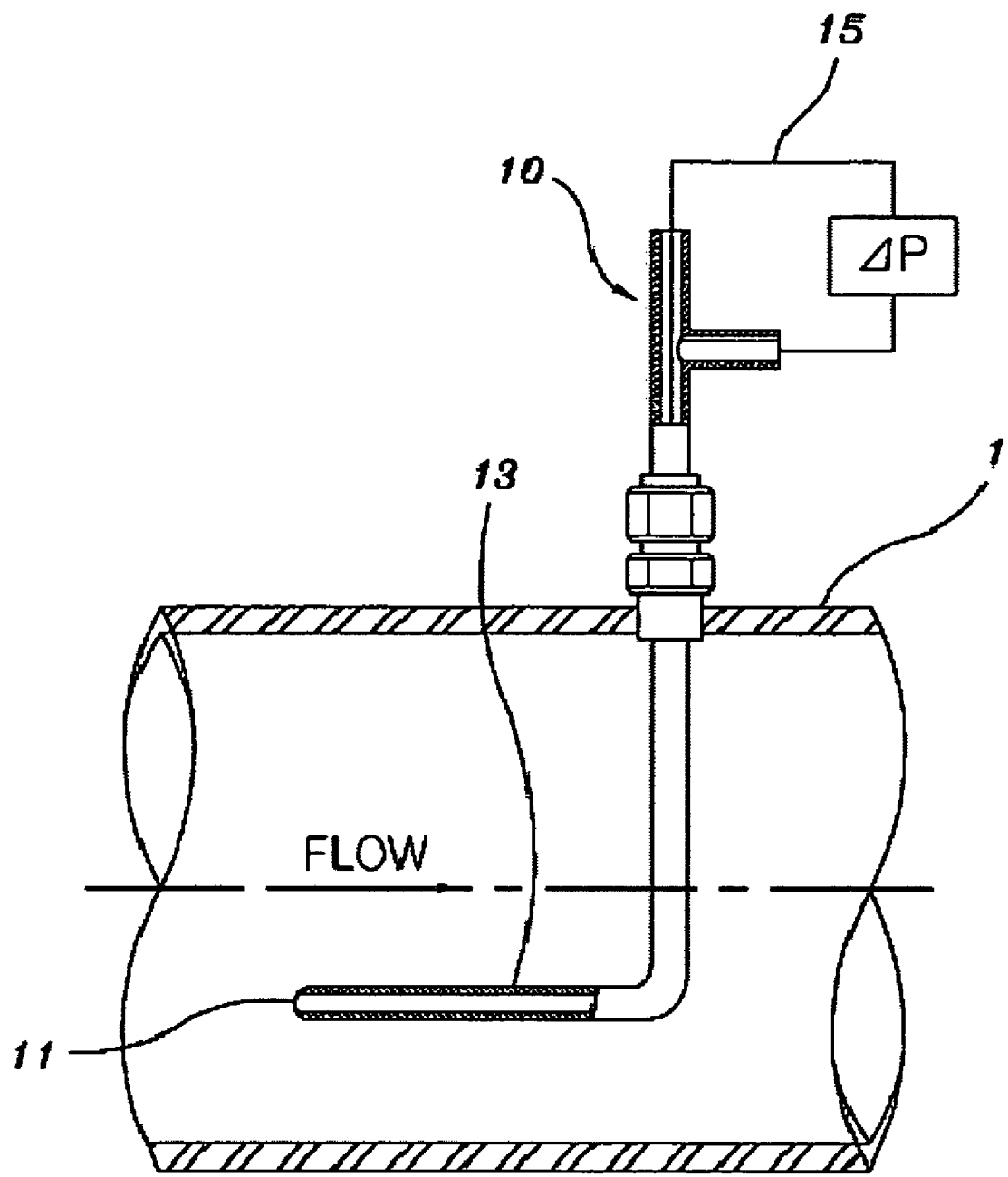
FIG. 1 is a side sectional view to show a conventional pitot tube installed at a predetermined position of a pipe.
Figure 2:
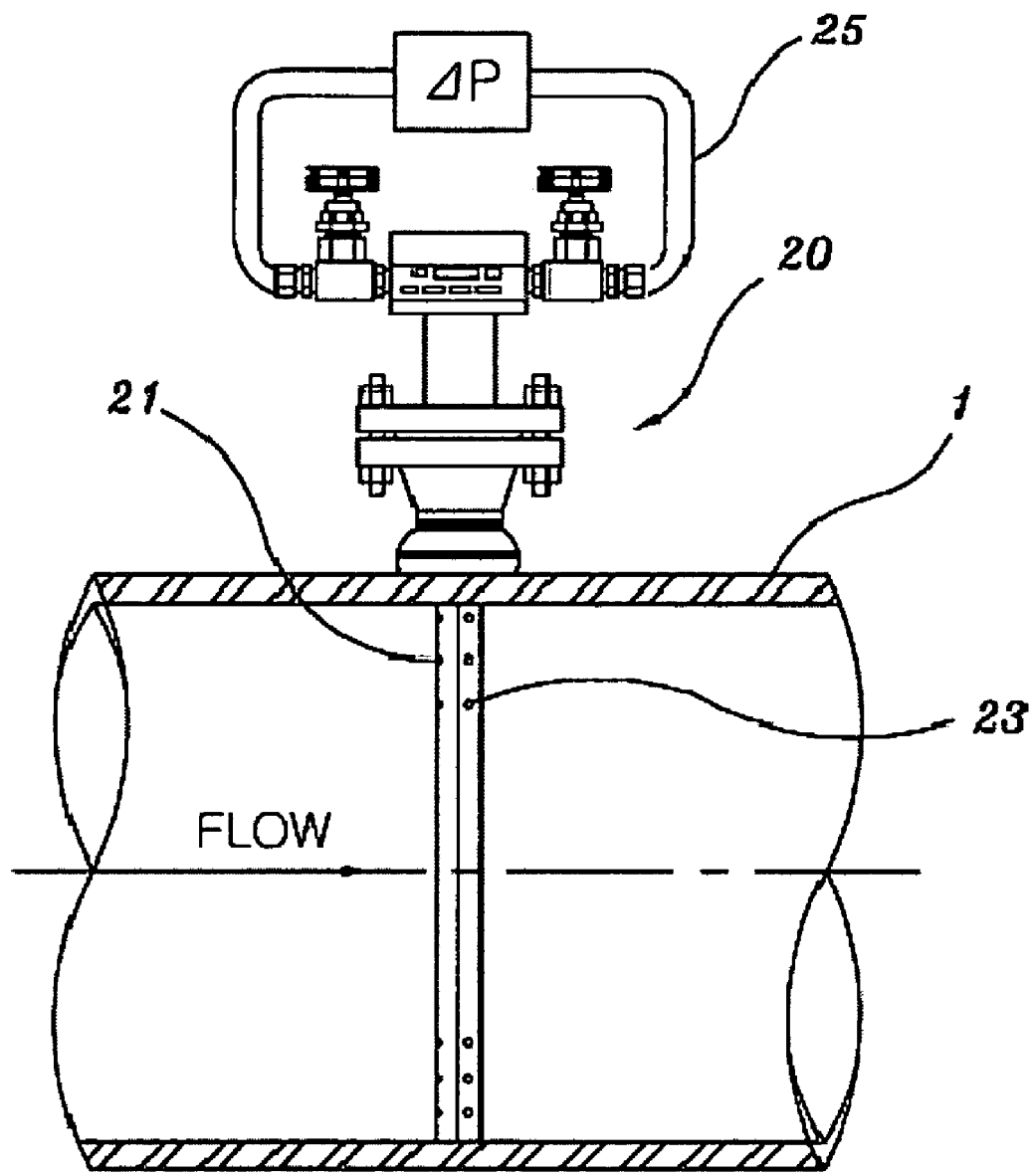
FIG. 2 is a side sectional view to show a conventional average pitot tube installed at a predetermined position of a pipe.
Figure 3:
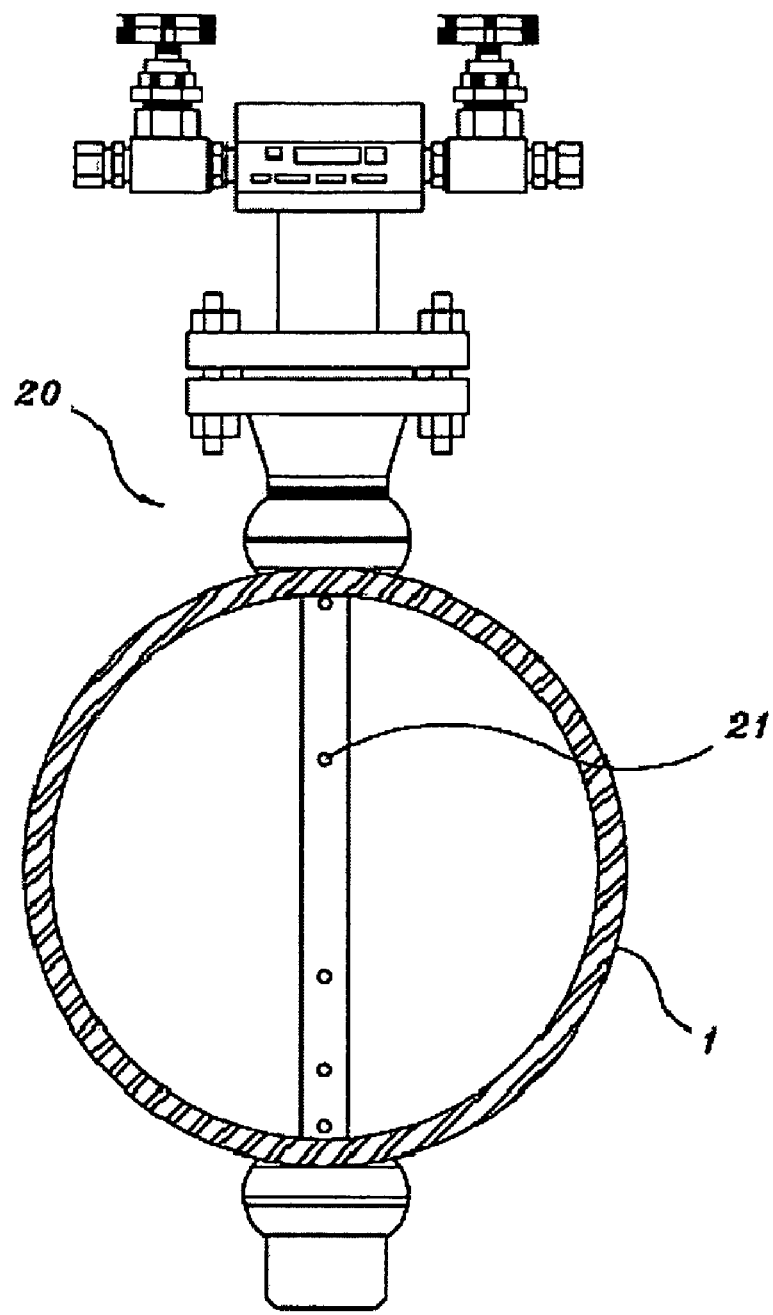
FIG. 3 is a front sectional view of the conventional average pitot tube installed at the pipe.
Figure 4:
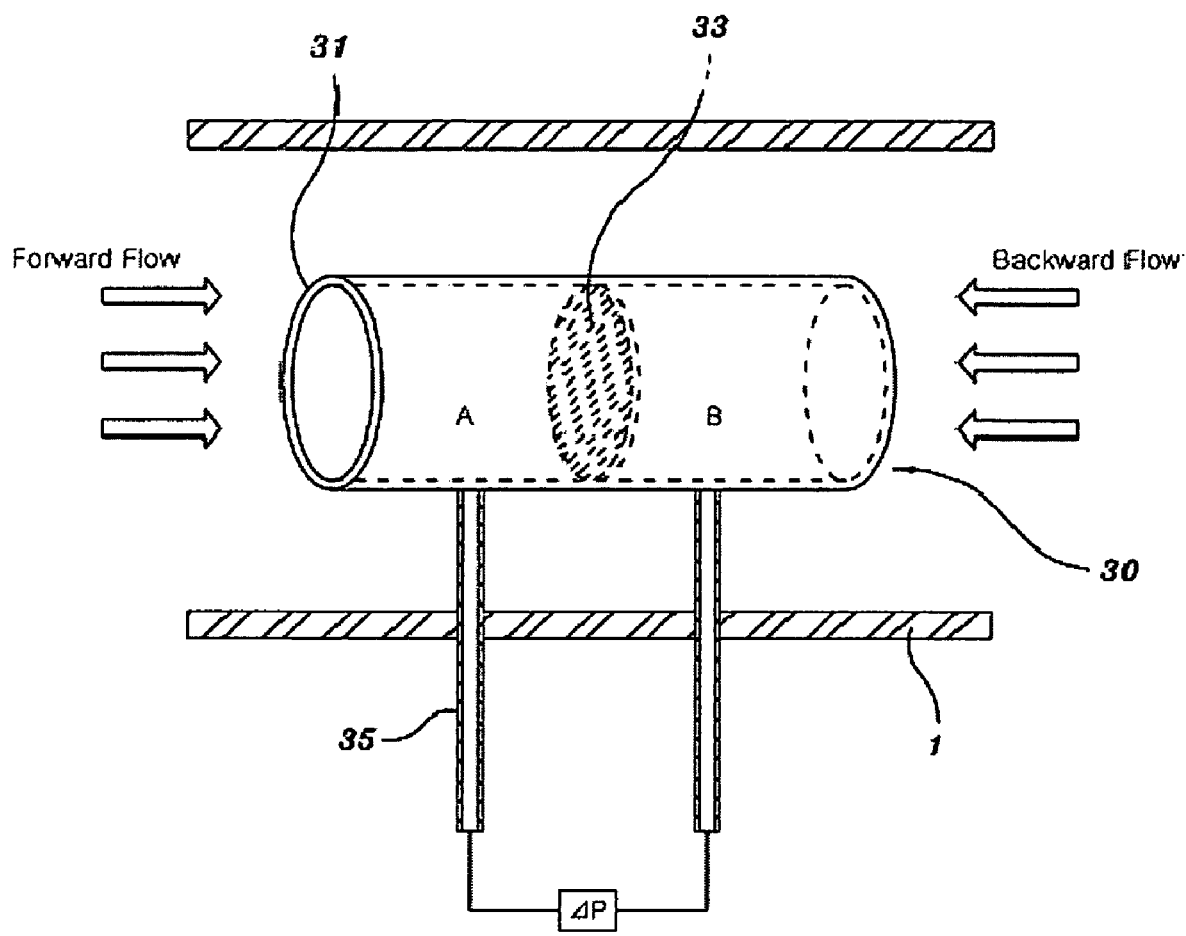
FIG. 4 is a perspective view of a conventional local bidirectional flow tube installed at a predetermined position in a pipe.
Figure 5:
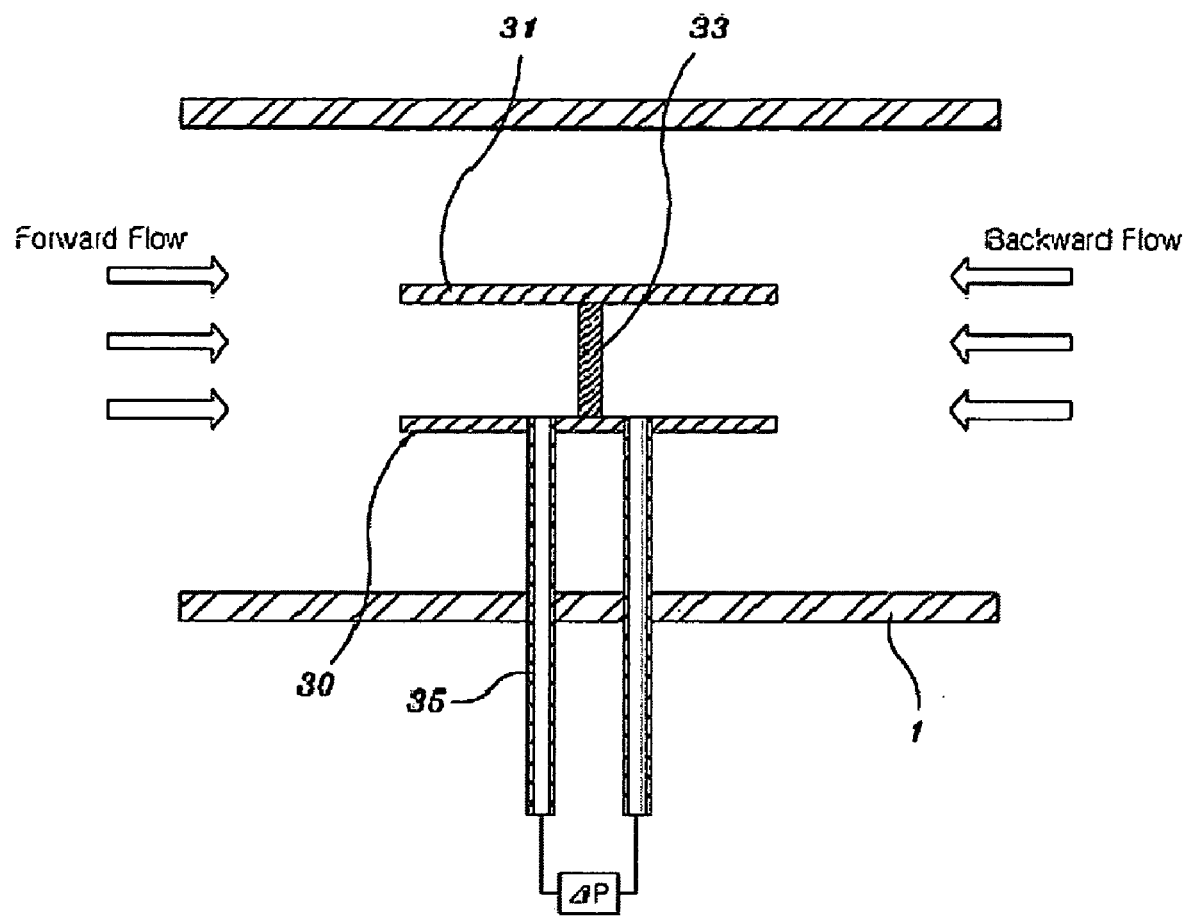
FIG. 5 is a side sectional view to show the conventional local bidirectional flow tube installed in the pipe.
Figure 6:
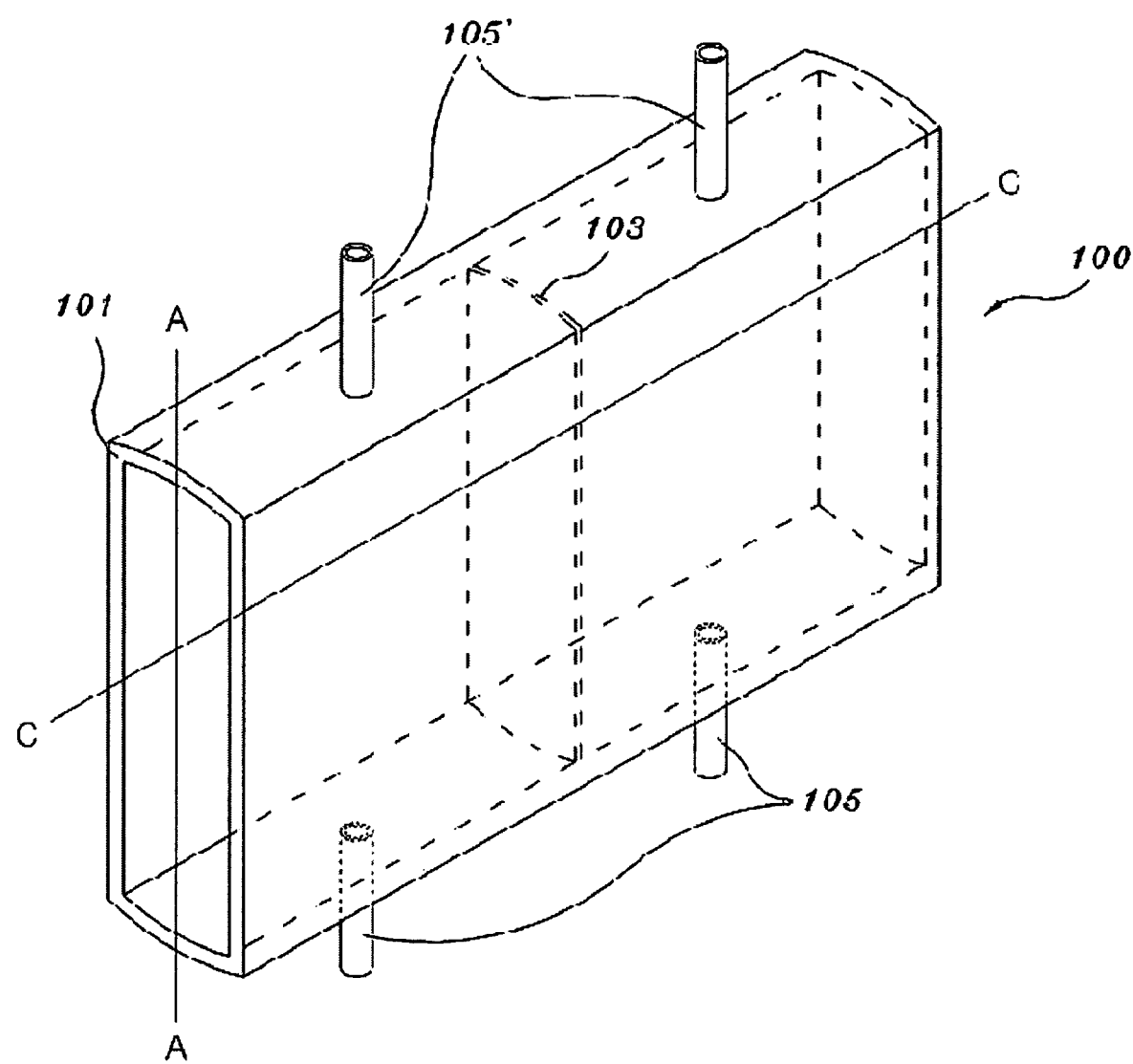
FIG. 6 is a perspective view to show an average bidirectional flow tube, according to an embodiment of the present invention.
Figure 7:
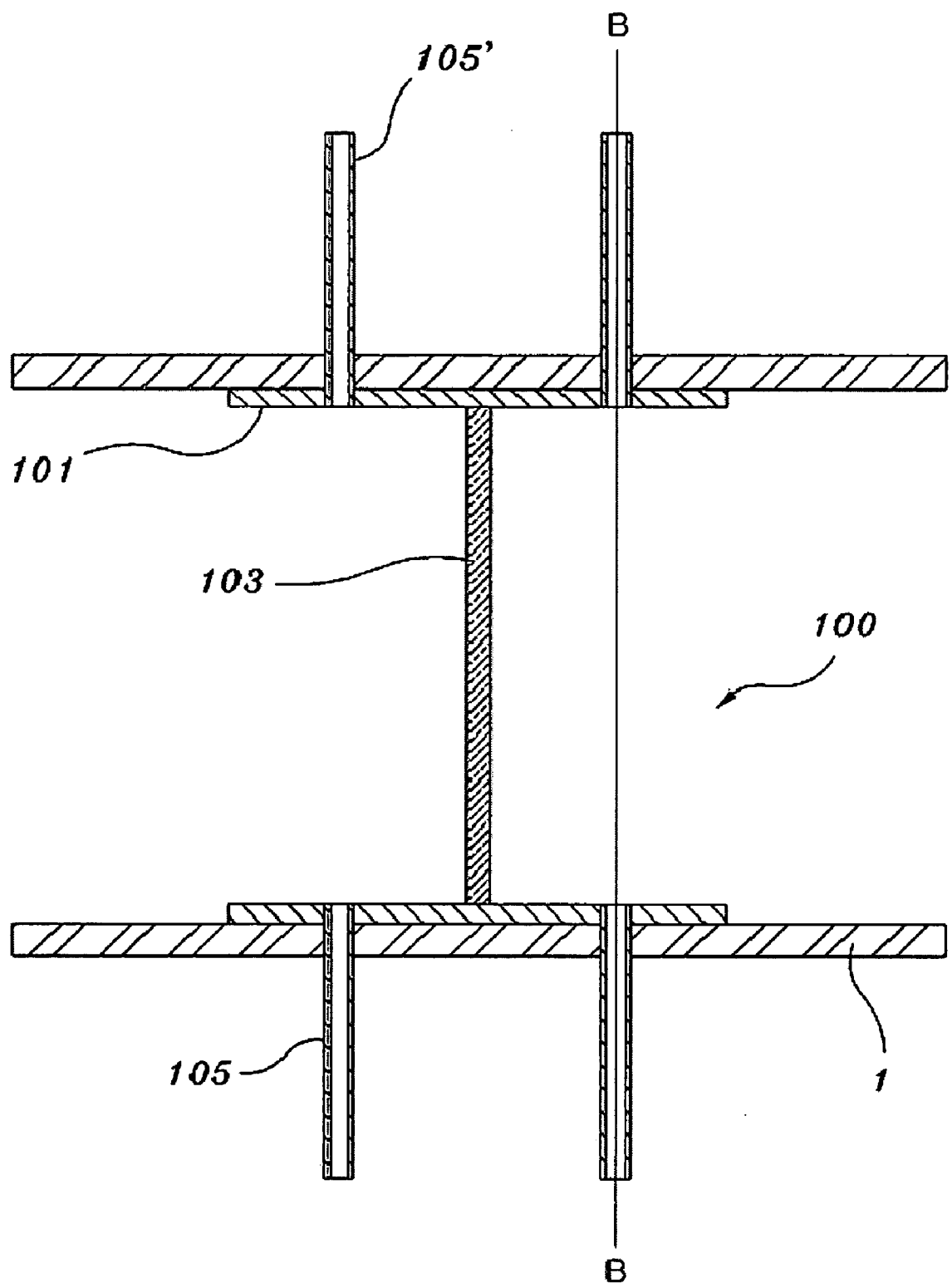
FIG. 7 is a side sectional view to show the average bidirectional flow tube installed at a predetermined position in a pipe.
Figure 8:
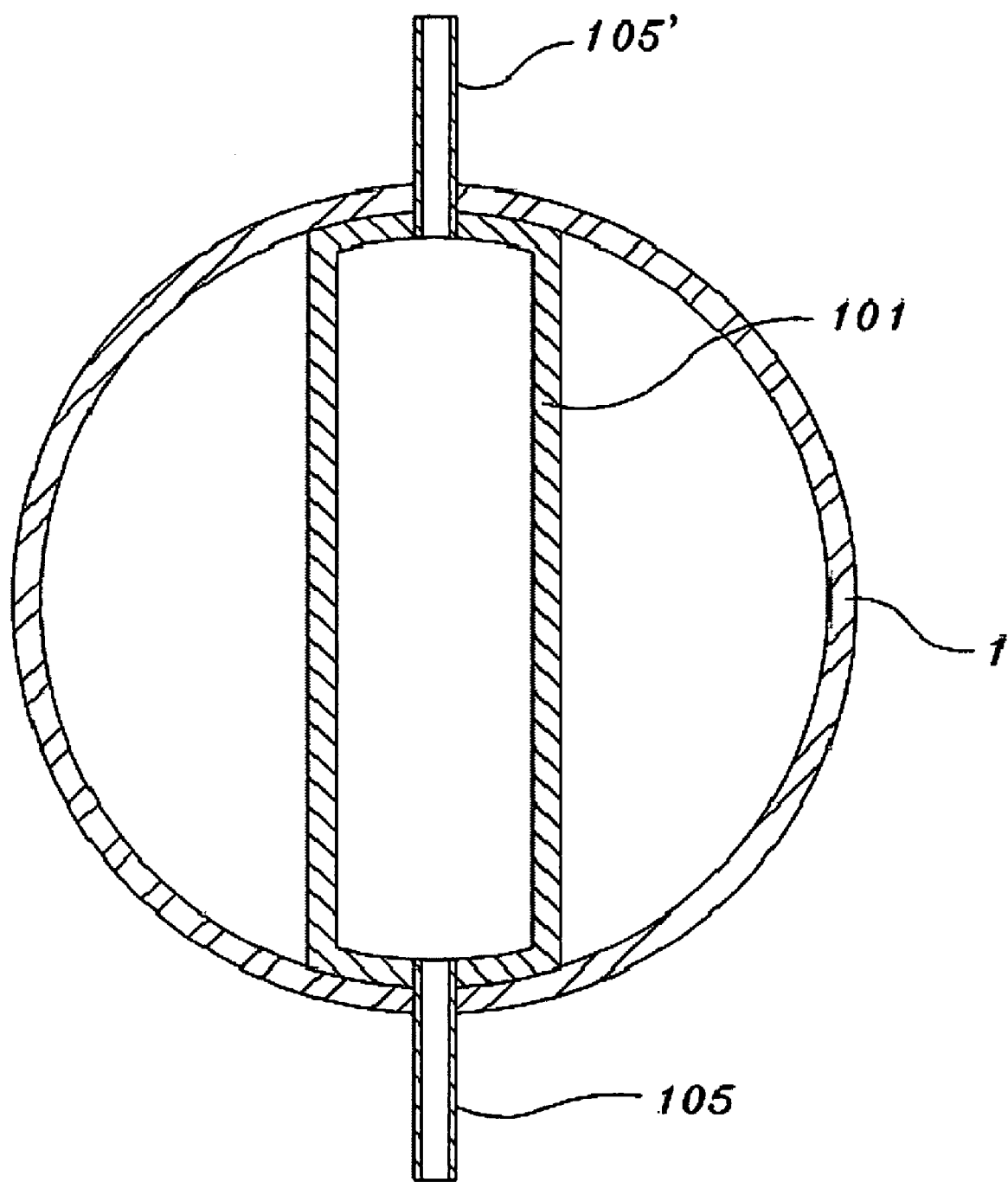
FIG. 8 is a sectional view taken along the line B—B of FIG. 7.
Figure 9:
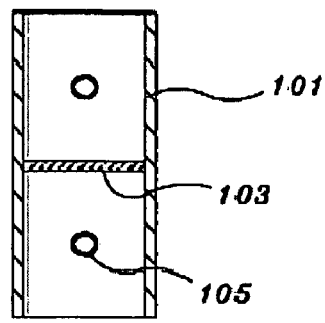
FIG. 9 is a sectional view taken along the line C—C of FIG. 6.
Figure 10:
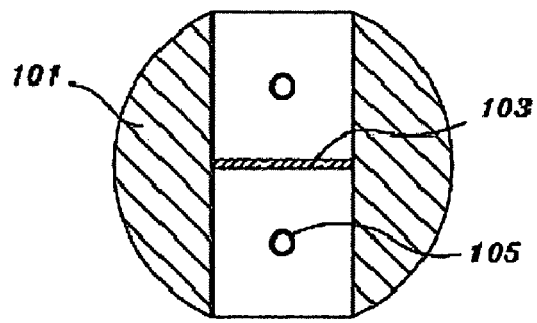
FIG. 10 is a view corresponding to FIG. 9, but shows an average bidirectional flow tube, according to another embodiment of the present invention.
Figure 11:
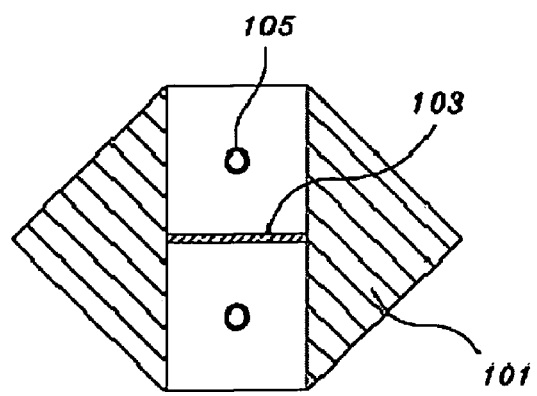
FIG. 11 is a view corresponding to FIG. 9, but shows an average bidirectional flow tube, according to a further embodiment of the present invention.

FIG. 6 shows an average bidirectional flow tube 100, according to an embodiment of the present invention, FIG. 7 is a side sectional view of a pipe 1 in which the average bidirectional flow tube 100 is installed, FIG. 8 is a sectional view taken along the line B—B of FIG. 7, and FIG. 9 is a sectional view taken along the line C—C of FIG. 6. In this case, the same reference numerals are used throughout the different drawings to designate the same or similar components.

As shown in FIG. 6, the average bidirectional flow tube 100 according to the present invention includes a body 101, a partition plate 103, and two pairs of pressure impulse lines 105 and 105'. Hereinafter, the pressure impulse lines 105 and 105' might be referred to as an upper pressure impulse line 105' and a lower pressure impulse line 105, respectively. The body 101 includes two side plates and upper and lower plates. The partition plate 103 is installed to be perpendicular to the side plates of the body 101 so that front and rear ends of the tube are separated from each other. Each of the two pairs of pressure impulse lines 105 and 105' is installed at each of front and rear positions of the partition plate 103. As shown in FIGS. 7 and 8, the upper and lower plates of the body 101 have a predetermined curvature to be in contact with an inner surface of a pipe 1 in which the average bidirectional flow tube 100 is installed. Further, the pressure impulse lines 105 and 105' are installed to communicate with the interior of the pipe 1.

Preferably, the side plates constituting the average bidirectional flow tube 100 are installed to be parallel to each other. The partition plate 103 is installed to be perpendicular to the side plates. The two pairs of pressure impulse lines 105 and 105' are connected to a differential pressure transmitter (not shown), respectively, which is used to measure pressures at front and rear positions of the partition plate 103.

FIG. 9 shows an average bidirectional flow tube 100 having the shape of a plane, according to another embodiment of the present invention. Preferably, the side plates and the partition plate 103 of the average bidirectional flow tube 100 according to the present invention comprise thin panels. However, without being limited to this embodiment, each of the side plates may have an arc-shaped cross-section or a triangular cross-section.

The operation of the average bidirectional flow tube 100 will be described below. Referring to FIG. 7, when a fluid flows from a left side to a right side of the pipe 1 in which the average bidirectional flow tube 100 is installed, the total pressure, obtained as a result of adding the static pressure to the dynamic pressure due to the flow of the fluid, acts on the left side of the partition plate 103. Meanwhile, back pressure, which is slightly less than the static pressure due to the suction effect caused by the flow velocity of the fluid of the right side, acts on the right side of the partition plate 103. The total pressure and the back pressure are measured in the differential pressure transmitter (not shown) connected to the pressure impulse lines 105 and 105', thus calculating the difference between the total pressure and the back pressure. Alternatively, a differential pressure gauge (not shown) may be connected to the pressure impulse lines 105 and 105', thus calculating the difference between the total pressure and the back pressure.

As described above, the present invention provides an average bidirectional flow tube 100 which is used to measure a flow rate of a fluid flowing in a pipe. The average bidirectional flow tube of this invention has the following effects.

In case of measuring the flow rate of a fluid in two-phase flow, the flow rate of gaseous portion which consists of the upper portion of the two-phase flow might be measured with a differential pressure transmitter which is connected to the upper pressure impulse line 105', while the flow rate of liquid portion which consists of the lower portion of the two-phase flow might be measured with a differential pressure transmitter which is connected to the lower pressure impulse line 105.

Since a back pressure is reduced to be less than a static pressure, it is easy to measure an average flow rate in a pipe 1 even when a fluid flows at a low speed. Further, although a two-phase flow occurs, that is, a liquid flows along the bottom of the pipe 1 and gas flows separately above the liquid, the average flow rate of the fluid in the pipe 1 can be measured. Further, even when sudden pressure reduction occurs in the pipe and pressures acting on pressure impulse lines 105 and 105' are abruptly reduced, an additional cooling device is not required. Furthermore, even when two-phase flow occurs in the pipe 1, or the fluid suffers a phase change due to the sudden pressure reduction, or a stratified flow occurs due to the two-phase flow in a horizontal pipe, it is unnecessary to displace the average bidirectional flow tube 100 to another position. Moreover, although the direction of flow of the fluid flowing in the pipe is changed, the average flow rate of the fluid can be measured.

What is claimed is:

1. An average bidirectional flow tube, comprising a body including two side plates and upper and lower plates, a partition plate installed to be perpendicular to the side plates of the body so that front and rear ends of the tube are separated from each other, and a pair of pressure impulse lines mounted on the upper plate or the lower plate in front and rear positions of the partition plate, wherein the upper and lower plates of the body each have a curvature to be in contact with an inner surface of a pipe in which the average bidirectional flow tube is installed, and each of the differential pressure transmitter is installed to communicate with an interior of the pipe.

2. The average bidirectional flow tube according to claim 1, further comprising another pair of pressure impulse lines which are opposite to said a pair of pressure impulse lines and mounted on the upper or lower plate of the body.

3. The average bidirectional flow tube according to claim 1, wherein each of the side plates of the body has a triangular cross-section, and thereby the body has a diamond cross-section, or each of the side plates of the body has an arc-shaped cross-section, and thereby the body has an elliptical or circular cross-section.

* * * * *